United States Patent
McConville et al.

(10) Patent No.: US 11,931,799 B2
(45) Date of Patent: Mar. 19, 2024

(54) METAL DROP EJECTING THREE-DIMENSIONAL (3D) OBJECT PRINTER AND METHOD OF OPERATION FOR FORMING METAL SUPPORT STRUCTURES

(71) Applicant: ADDITIVE TECHNOLOGIES LLC, Palm City, FL (US)

(72) Inventors: Paul J. McConville, Webster, NY (US); Douglas K. Herrmann, Webster, NY (US); Seemit Praharaj, Webster, NY (US); Jason M. LeFevre, Penfield, NY (US); Chu-Heng Liu, Penfield, NY (US)

(73) Assignee: Additive Technologies LLC, Palm City, FL (US)

( * ) Notice: Subject to any disclaimer, the term of this patent is extended or adjusted under 35 U.S.C. 154(b) by 186 days.

(21) Appl. No.: 17/412,399

(22) Filed: Aug. 26, 2021

(65) Prior Publication Data

US 2023/0063103 A1 Mar. 2, 2023

(51) Int. Cl.

| | |
|---|---|
| *B22D 23/00* | (2006.01) |
| *B22F 10/22* | (2021.01) |
| *B22F 10/36* | (2021.01) |
| *B22F 12/30* | (2021.01) |
| *B22F 12/41* | (2021.01) |
| *B22F 12/53* | (2021.01) |
| *B22F 12/70* | (2021.01) |
| *B33Y 10/00* | (2015.01) |
| *B33Y 30/00* | (2015.01) |

(52) U.S. Cl.
CPC ............ *B22D 23/003* (2013.01); *B22F 10/22* (2021.01); *B22F 10/36* (2021.01); *B22F 12/30* (2021.01); *B22F 12/41* (2021.01); *B22F 12/53* (2021.01); *B22F 12/70* (2021.01); *B33Y 10/00* (2014.12); *B33Y 30/00* (2014.12)

(58) Field of Classification Search
CPC ........ B22D 23/003; B22F 12/53; B22F 12/41; B22F 10/36; B22F 12/70; B22F 10/22; B22F 12/30; B33Y 10/00; B33Y 30/00; B33Y 40/00
USPC ......... 222/590, 591, 593; 266/236; 700/118, 700/119
See application file for complete search history.

(56) References Cited

U.S. PATENT DOCUMENTS

| | | | |
|---|---|---|---|
| 9,302,519 B1 * | 4/2016 | Clark | ..................... B41J 2/2142 |
| 9,616,494 B2 | 4/2017 | Vader et al. | |
| 10,040,119 B2 | 8/2018 | Vader et al. | |

(Continued)

*Primary Examiner* — Scott R Kastler
*Assistant Examiner* — Michael Aboagye
(74) *Attorney, Agent, or Firm* — Maginot Moore & Beck LLP

(57) ABSTRACT

A three-dimensional (3D) metal object manufacturing apparatus is equipped with a movable directed energy source to melt hardened metal drops and form an oxidation layer. A metal support structure can be formed over the oxidation layer, an object feature can be formed over the oxidation layer, or both a metal support structure and an object feature can be formed over oxidation layers located at opposite sides of a metal support structure. The oxidation layers weakly attach the metal support structure to the object feature supported by the metal support structure so the support structure can be easily removed after manufacture of the object is complete.

9 Claims, 4 Drawing Sheets

(56) References Cited

U.S. PATENT DOCUMENTS

| | | | | |
|---|---|---|---|---|
| 11,059,229 B2* | 7/2021 | Kothari | ............. | G05B 19/4097 |
| 11,167,496 B2* | 11/2021 | Schalk | .................. | B33Y 40/20 |
| 11,548,069 B2* | 1/2023 | Mackie | .................. | B22F 10/50 |
| 2018/0345573 A1* | 12/2018 | Zinniel | ................... | B21C 33/02 |
| 2022/0219238 A1* | 7/2022 | LeFevre | .................... | B41J 2/04 |

* cited by examiner

METAL DROP EJECTING THREE-DIMENSIONAL (3D) OBJECT PRINTER AND METHOD OF OPERATION FOR FORMING METAL SUPPORT STRUCTURES

TECHNICAL FIELD

This disclosure is directed to three-dimensional (3D) object printers that eject melted metal drops to form objects and, more particularly, to the formation of metal support structures with the ejected metal used to form objects in such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers, while others melt plastic materials to produce thermoplastic material that is extruded to form successive layers of thermoplastic material. These technologies are used to construct three-dimensional objects with a variety of shapes and features. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D metal objects. These printers have a source of solid metal, such as a roll of wire, macro-sized pellets, or metal powder, and the solid metal is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes a drop of melted metal at the nozzle of the receptacle to separate from the melted metal within the receptacle and be propelled from the nozzle. A platform is configured to move in a X-Y plane parallel to the plane of the platform by a controller operating actuators so melted metal drops ejected from the nozzle form metal layers of an object on the platform. The controller operates another actuator to alter the position of the ejector or platform to maintain a constant distance between the ejector and an existing layer of the metal object being formed. This type of metal drop ejecting printer is also known as a magnetohydrodynamic (MHD) printer.

In the 3D object printing systems that use elastomer materials, temporary support structures are formed by using an additional ejector to eject drops of a different material to form supports for overhang and other object features that extend away from the object during formation of the object. Because these support structures are made from materials that are different than the materials that form the object they can be designed not to adhere or bond well with the object. Consequently, they can be easily separated from the object feature that they supported during object manufacture and removed from the object after object formation is finished. Such is not the case with metal drop ejecting systems. If the melted metal used to form objects with the printer is also used to form support structures, then the support structure bonds strongly with the features of the object that need support while they solidify. Consequently, a significant amount of machining and polishing is needed to remove the supports from the object. Coordinating another metal drop ejecting printer using a different metal is difficult because the thermal conditions for the different metals can affect the build environments of the two printers. For example, a support structure metal having a higher melting temperature can weaken or soften the metal forming the object or a support metal structure having a lower melting temperature that the object can weaken when the object feature made with the higher temperature melted metal contacts the support structure. Being able to form support structures that enable metal drop ejecting printers to form metal object overhangs and other extending features would be beneficial.

SUMMARY

A new method of operating a 3D metal object printer forms support structures that do not adhere tightly to object features supported by the structures without adversely impacting the environment of the 3D metal object printer. The method includes operating with a controller at least one actuator to move a directed energy source over a partially formed hardened metal object on a planar member, and operating with the controller the directed energy source to form a first oxidation layer on the surface of the hardened metal object.

A new 3D metal object printer forms support structures that do not adhere tightly to object features supported by the structures without adversely impacting the environment of the 3D metal object printer. The new 3D metal object printer includes an ejector head having a vessel with a receptacle within the vessel that is configured to hold a volume of melted metal, a planar member positioned to receive melted metal drops ejected from the ejector head, a directed energy source configured to direct a beam of energy toward the planar member, at least one actuator operatively connected to the directed energy source and the planar member, and a controller operatively connected to the at least one actuator and the directed energy source, the controller being configured to operate the directed energy source to direct the beam of energy onto hardened metal to form a first oxidation layer on the hardened metal.

BRIEF DESCRIPTION OF THE DRAWINGS

The foregoing aspects and other features of a method for forms support structures that do not adhere tightly to object features supported by the structures without adversely impacting the environment of the 3D metal object printer and a 3D metal object printer that implements the method are explained in the following description, taken in connection with the accompanying drawings.

DETAILED DESCRIPTION

Figure 1:
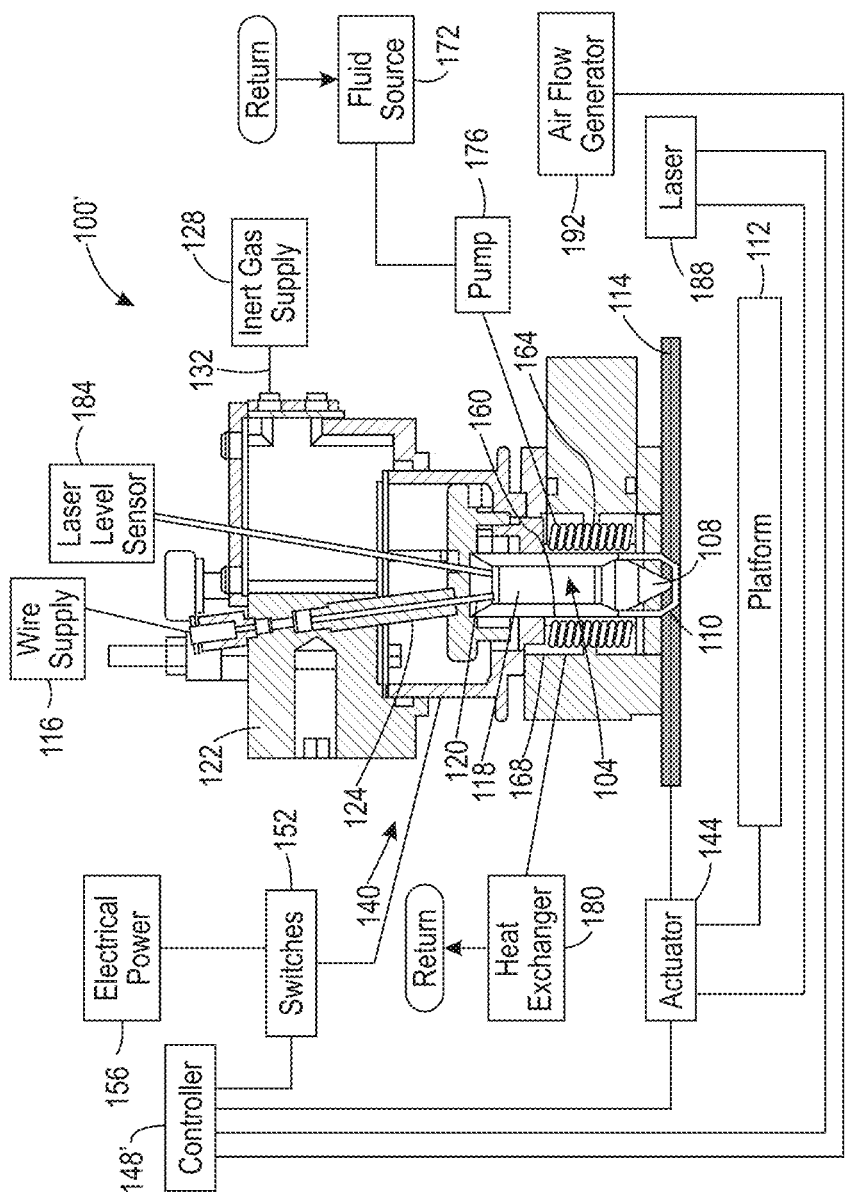
FIG. 1 depicts a new 3D metal object printer that forms support structures that do not adhere tightly to object features supported by the structures without adversely impacting the environment of the 3D metal object printer.

For a general understanding of the environment for the 3D metal object printer and its operation as disclosed herein as well as the details for the printer and its operation, reference is made to the drawings. In the drawings, like reference numerals designate like elements.

Figure 4:
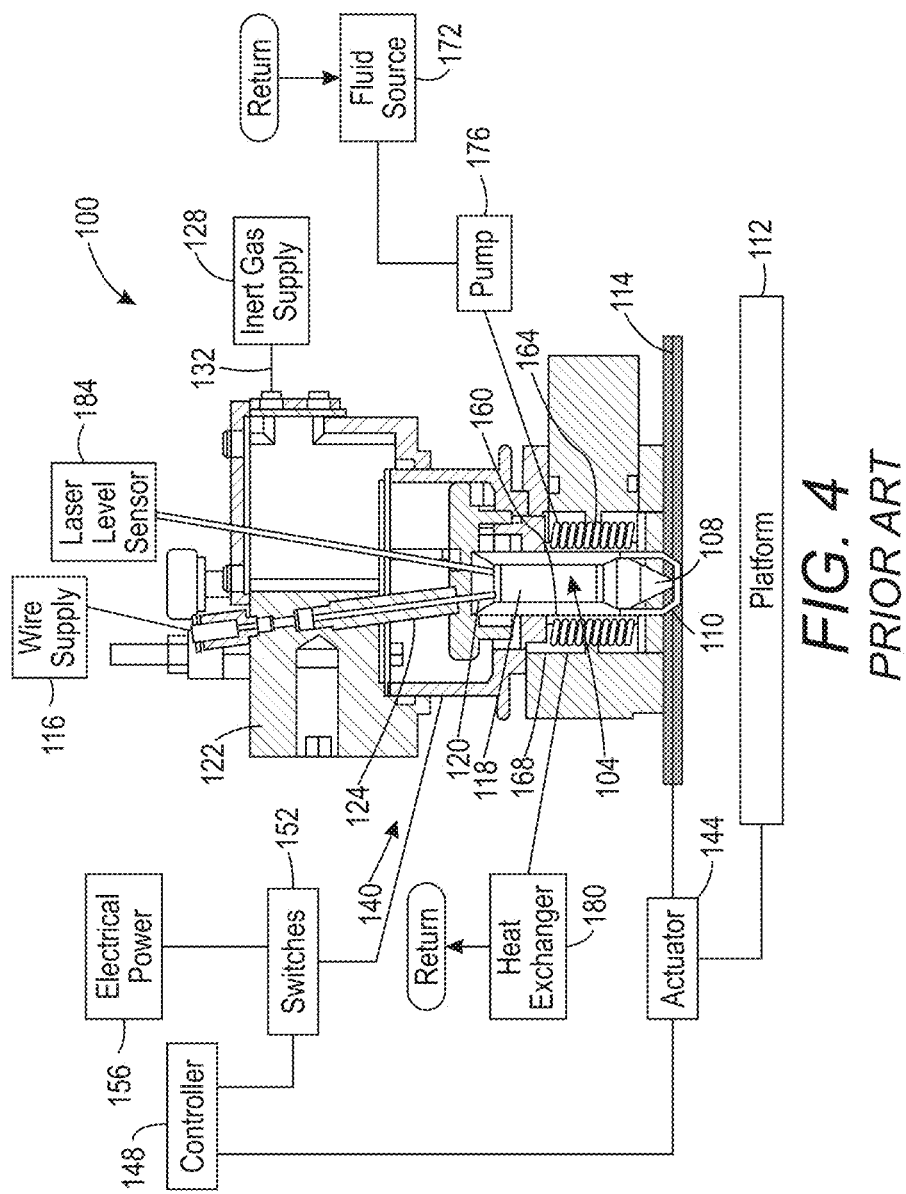
FIG. 4 is a block diagram of a prior art 3D metal printer that does not include components for forming support structures made with the same metal being used to form the object.

FIG. 4 illustrates an embodiment of a previously known 3D metal object printer 100 that cannot form support structures with the same melted metal being used to form a metal object without the support structures adhering too tightly to the object features. In the printer of FIG. 4, drops of melted bulk metal are ejected from a receptacle of a removable vessel 104 having a single nozzle 108 to form layers of the manufactured object on a build platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge, macro-sized metal pellets, and metal powder.

With further reference to FIG. 4, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at an appropriate level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and a surface of an object on the platform 112.

Moving the platform 112 in the X-Y plane as drops of molten metal are ejected toward the platform 112 forms a swath of melted metal drops on the object being formed. Controller 148 also operates actuators 144 to adjust the distance between the ejector head 140 and the most recently formed layer on the substrate to facilitate formation of other structures on the object. While the molten metal 3D object printer 100 is depicted in FIG. 4 as being operated in a vertical orientation, other alternative orientations can be employed. Also, while the embodiment shown in FIG. 4 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with a controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and a surface of the object on the platform 112.

Using like reference numbers for like components and removing some of the components not used to form metal support structures that do not adhere too tightly to the object during formation, a new 3D metal object printer 100' is shown in FIG. 1. The printer 100' includes a directed energy source 188 that is operated by the controller 148', which is configured with programmed instructions stored in a non-transitory memory connected to the controller so when the controller 148' executes the programmed instructions it operates the directed energy source and actuators moving the directed energy source as described below to form metal support structure interfaces with the same melted metal being used to form the metal object without attaching the support structures too strongly to the object features being supported. As used in this document, the term "directed energy source" means a generator of a focused stream of light, atomic particles, or sub-atomic particles having sufficient energy to remelt the metal being used to form metal object features in the presence of oxygen. The directed energy source shown in FIG. 1 is a laser that can be of any wavelength or power that is sufficient to remelt the metal build material in the presence of oxygen. In other embodiments, the directed energy source includes generators of atomic particles, electron beams, or other sub-atomic particles. The type of laser used for forming the support structure interfaces is different than the laser used in the melted metal level sensor as its intensity and wavelength are sufficient to melt metal drops that have hardened after being ejected by the ejector head 140. As used in this document, the term "remelt" means raising a metal to a temperature sufficient to cause hardened metal to become a liquid. This temperature is known as the liquidous temperature. The term "hardened metal," as used in this document, means melted metal that has a phase change to become solid. A target range for the temperature to which the hardened metal is heated is, in one embodiment, between the liquidous temperature to a temperature of about 25° C. above the liquidous temperature.

The printer 100' forms metal support structures by forming a layer of the support with melted metal ejected from the ejector head 140 and then operating the directed energy source to remelt the support structure layer in the absence of the inert gas. The remelting in the ambient air results in oxidation of the support structure layer. Additional layers of the support structure are formed with melted metal drops that are primarily unoxidized until the final layer of the support structure is formed. This final layer is also remelted in the ambient air so the intervening support structure is weakly attached to the object at both the base of the structure and its final layer. These weak attachments enable the support structure to be easily removed after the object is completed. Printer 100' also includes an airflow generator 192. The airflow generator 192 can be an electrical fan, a source of pressurized air, or the like. The controller 148' is operatively connected to the airflow generator 192 to operate the airflow generator selectively while an oxidation layer is being formed to enhance the formation of the oxidation layer.

Figure 2:
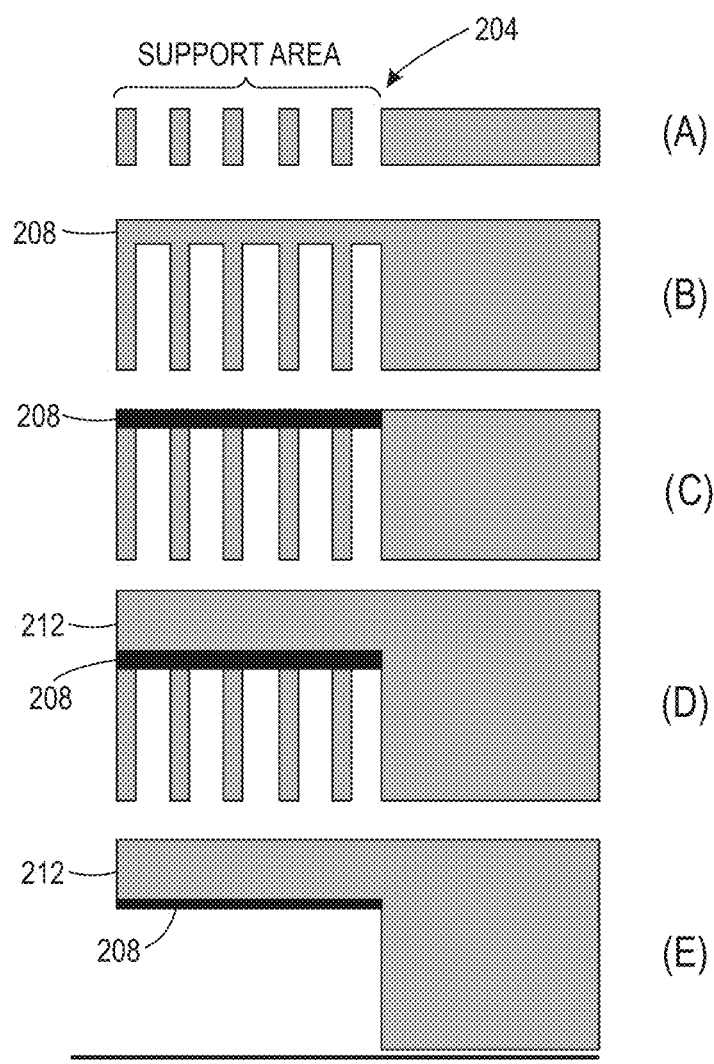
FIG. 2 illustrates the use of the 3D metal object printer shown in FIG. 1 to form support structures that do not adhere tightly to object features.

FIG. 2 depicts five steps of an exemplary process for forming a plurality of weakly attached support structures for a horizontal overhang in a metal object formed with the printer of FIG. 1. In step (A), a plurality of metal support pillars 204 are formed on the platform 112 (FIG. 1) using the melted metal drops ejected from the ejector head in a known manner. In step (B), a capping structure 208 is formed in the same manner. In step (C), the controller 148' operates the actuators 144 and the laser 188 (also shown in FIG. 1) to move the laser beam over the capping structure 208 and heat the capping structure to a temperature sufficient to at least melt a portion of the uppermost layer of the capping structure in the absence of the inert gas. This remelted capping structure 208 forms an oxidation layer. A horizontal overhang 212 is formed on the oxidation layer of capping structure 208 in step (D). After the manufacture of the object is completed, the pillars 204 can be easily removed as shown in step (E) because the oxidation layer on the capping structure attenuates the bonding between the base layer of the overhang 212 and the capping structure 208.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object on the platform 112.

Figure 3:
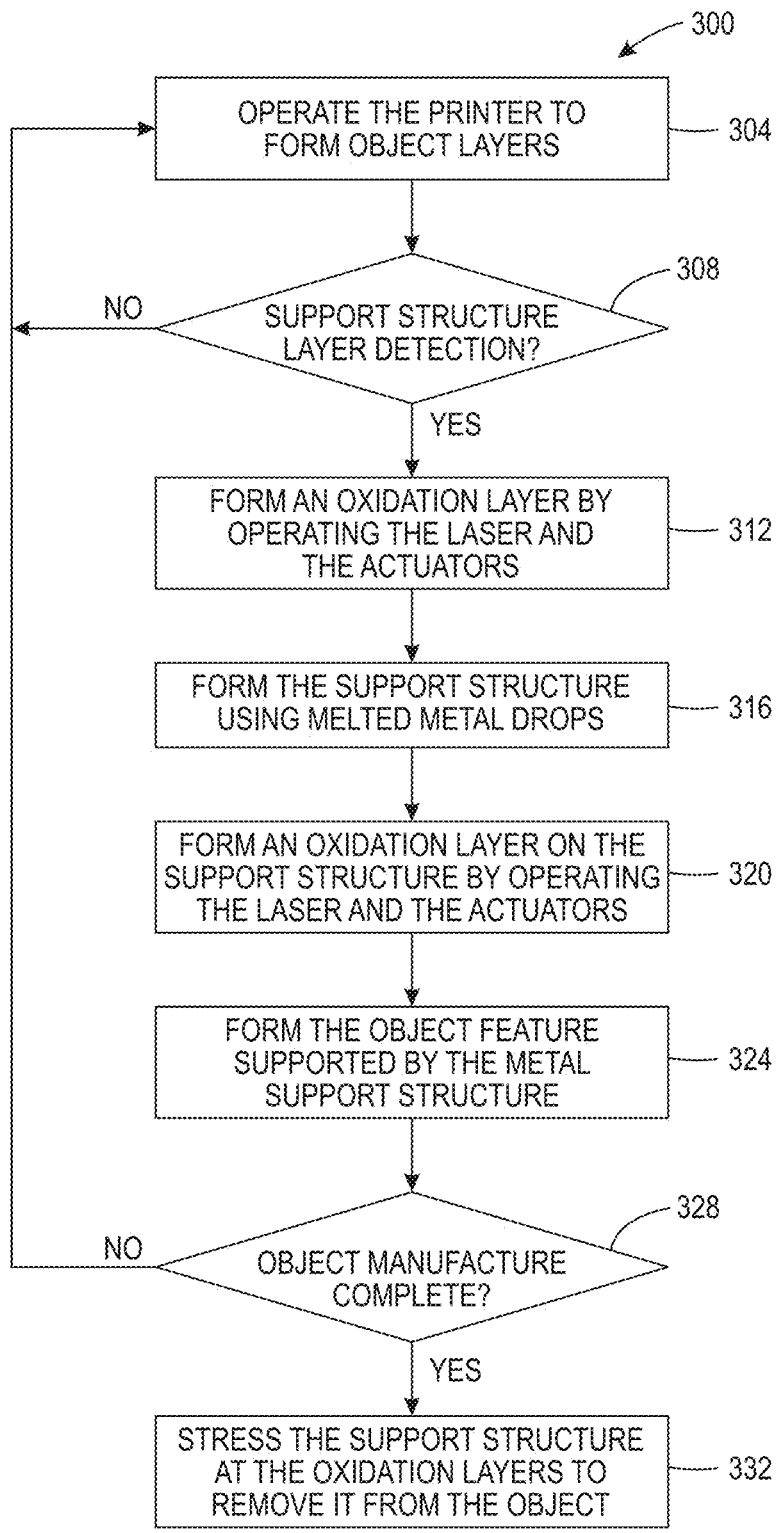
FIG. 3 is a flow diagram for a process that forms support structures that do not adhere tightly to object features supported by the structures without adversely impacting the environment of the 3D metal object printer.

A process for operating the 3D metal object printer 100' to form metal support structures that weakly attach to object features is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram for a process 300 that uses the laser and the controller 148' configured to execute programmed instructions stored in a non-transitory memory operatively connected to the controller to build metal support structures that are weakly attached to the object features that they support or on which they are built. The process forms layers of an object (block 304) until a base layer for a support structure is detected (block 308). The controller operates the actuators and laser to remelt the last layer formed so an oxidation layer can form (block 312). The support structure is formed with melted metal drops ejected from the ejector head (block 316). The controller operates the actuators and laser to remelt the last layer formed for the support structure so an oxidation layer can form (block 320). The object feature to be supported by the metal support structure is formed on the oxidation layer of the support structure (block 324). When manufacture of the object is complete (block 328), the support structure is removed by stressing the support structure at the oxidation layers (block 332).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising: an ejector head having a vessel with a receptacle within the vessel that is configured to hold a volume of melted metal; a planar member positioned to receive melted metal drops ejected from the ejector head; a directed energy source configured to direct a beam of energy toward the planar member; at least one actuator operatively connected to the directed energy source and the planar member; and a controller operatively connected to the ejector head, the at least one actuator and the directed energy source, the controller being configured to operate the ejector head to eject melted metal drops from the receptacle of the vessel towards the planar member, operate the directed energy source to direct the beam of energy onto melted metal drops that have hardened and cause the hardened melted metal drops to remelt to form a first oxidation layer on the hardened melted metal drops, and operate the ejector head to form one or more layers of the melted metal drops on the first oxidation layer to form a metal support structure on the first oxidation layer.

2. The metal drop ejecting apparatus of claim 1 wherein the directed energy source is a laser.

3. The metal drop ejecting apparatus of claim 1 wherein the directed energy source is a generator of a beam of atomic or sub-atomic particles.

4. The metal drop ejecting apparatus of claim 1 the controller being further configured to:
   operate the ejector head to form a last layer of the metal support structure; and
   operate the at least one actuator to move the laser beam over the last layer of the metal support structure while operating the laser to form a second oxidation layer on the last layer of the metal support structure.

5. The metal drop ejecting apparatus of claim 4, the controller being further configured to:
   operate the ejector head to form one or more layers of the melted metal drops on the second oxidation layer to form an object feature on the second oxidation layer.

6. The metal drop ejecting apparatus of claim 5 further comprising:
   an airflow generator;
   the controller being operatively connected to the airflow generator and the controller being further configured to:
      operate the airflow generator to direct air toward an area of the hardened melted metal drops that is illuminated with the laser beam.

7. The metal drop ejecting apparatus of claim 6 wherein the airflow generator is an electrical fan or a source of pressurized air.

8. The metal drop ejecting apparatus of claim 3 further comprising:
   an airflow generator;
   the controller being operatively connected to the airflow generator and the controller being further configured to:
      operate the airflow generator to direct air toward an area of the hardened melted metal drops that is illuminated with the beam of atomic or sub-atomic particles.

9. The metal drop ejecting apparatus of claim 8 wherein the airflow generator is an electrical fan or a source of pressurized air.

\* \* \* \* \*